United States Patent
Delecroix et al.

(10) Patent No.: US 7,251,871 B2
(45) Date of Patent: Aug. 7, 2007

(54) FABRICATING THREE-DIMENSIONAL ANNULAR FIBER STRUCTURES

(75) Inventors: Vincent Delecroix, Vernaison (FR); Renaud Duval, Lozanne (FR)

(73) Assignee: Messier-Bugatti, Velizy Villacoublay (FR)

( * ) Notice: Subject to any disclaimer, the term of this patent is extended or adjusted under 35 U.S.C. 154(b) by 64 days.

(21) Appl. No.: 11/322,123

(22) Filed: Dec. 29, 2005

(65) Prior Publication Data

US 2007/0090564 A1 Apr. 26, 2007

(30) Foreign Application Priority Data

Oct. 24, 2005 (FR) .................................. 05 10811

(51) Int. Cl.
*D04H 3/05* (2006.01)
(52) U.S. Cl. .............................. 28/107; 28/103; 28/101
(58) Field of Classification Search ................. 28/101, 28/102, 107, 100, 103, 109, 108, 110, 111–115, 28/143, 142; 264/258; 156/148, 184, 177, 156/178, 181, 440; 442/381, 387, 388; 428/36.3, 428/222; 112/420, 475.08, 475.01; 138/123, 138/124, 129, 141, 144
See application file for complete search history.

(56) References Cited

U.S. PATENT DOCUMENTS

| | | | | |
|---|---|---|---|---|
| 4,080,232 A | * | 3/1978 | Friedrich | 156/177 |
| 4,790,052 A | * | 12/1988 | Olry | 28/110 |
| 5,217,770 A | * | 6/1993 | Morris et al. | 428/36.3 |
| 5,242,745 A | * | 9/1993 | Aucagne et al. | 442/205 |
| 5,546,880 A | * | 8/1996 | Ronyak et al. | 112/475.01 |
| 5,662,855 A | | 9/1997 | Liew et al. | |
| 5,792,715 A | * | 8/1998 | Duval et al. | 442/388 |
| 5,876,322 A | * | 3/1999 | Piramoon | 494/16 |
| 6,009,605 A | | 1/2000 | Olry et al. | |
| 6,105,223 A | * | 8/2000 | Brown et al. | 28/111 |
| 6,347,440 B1 | * | 2/2002 | Duval et al. | 28/107 |
| 6,363,593 B1 | | 4/2002 | Duval et al. | |
| 6,367,130 B1 | * | 4/2002 | Duval et al. | 28/107 |
| 2001/0006866 A1 | * | 7/2001 | Kuroiwa et al. | 442/366 |
| 2005/0076995 A1 | * | 4/2005 | Yasui | 156/148 |
| 2005/0172465 A1 | * | 8/2005 | Duval | 28/101 |

FOREIGN PATENT DOCUMENTS

| | | |
|---|---|---|
| EP | 0 721 835 | 7/1996 |
| WO | WO 98/49382 | 11/1998 |
| WO | WO 2005/111292 | 11/2005 |

* cited by examiner

*Primary Examiner*—Amy B. Vanatta
(74) *Attorney, Agent, or Firm*—Weingarten, Schurgin, Gagnebin & Lebovici LLP

(57) ABSTRACT

The present invention provides a method of fabricating an annular fiber structure, the method comprising the steps consisting in: providing a first fiber sheet made up of substantially unidirectional elements; forming a transverse, first annular sheet by laying the first fiber sheet in alternation in one direction and in the opposite direction between coaxial outer and inner circular rings with the sheets being held at said rings; providing a second fiber sheet made up of substantially unidirectional elements; forming a circumferential, second annular sheet by depositing the second fiber sheet in a circumferential direction between said outer and inner rings; bonding the transverse and circumferential annular sheets to each other; and driving the transverse and circumferential annular sheets in rotation about the axis of the outer and inner rings so as to perform a plurality of complete revolutions in order to obtain a thick annular fiber structure having layers made up by the transverse sheet alternating with and bonded to layers made up by the circumferential sheet. The invention also provides an installation for performing the method.

22 Claims, 8 Drawing Sheets

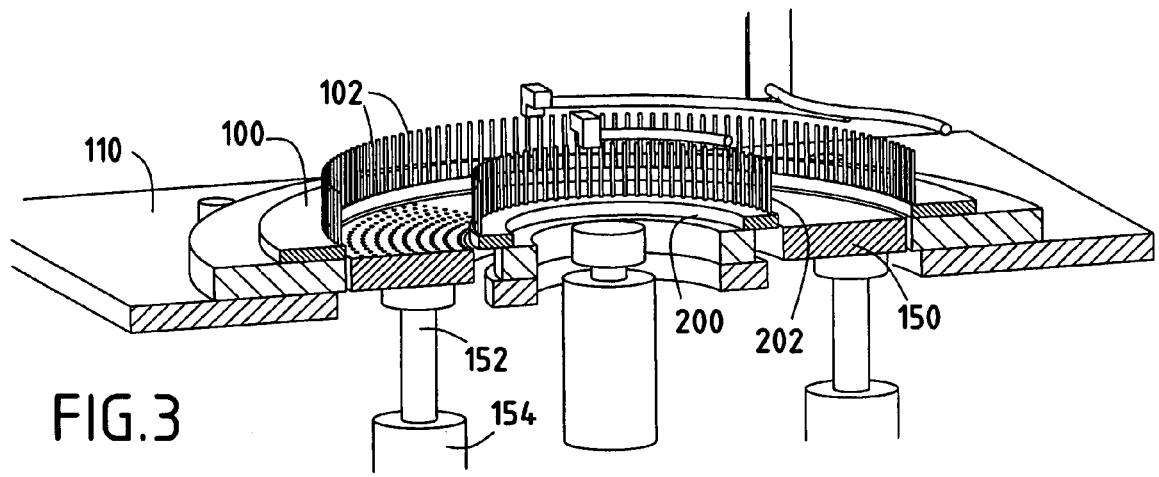
FIG. 3
FIG. 10A
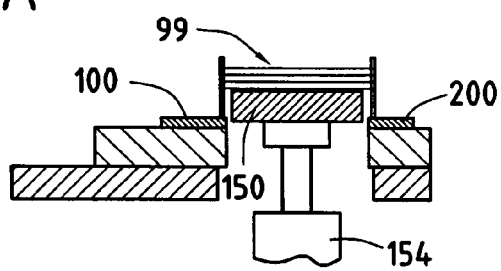
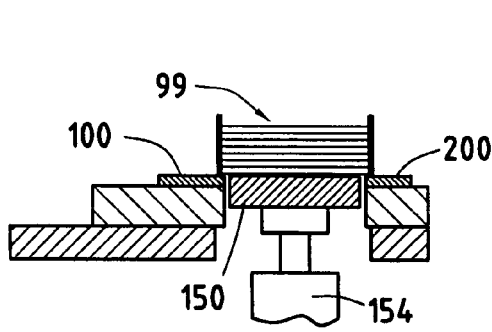
FIG. 10B
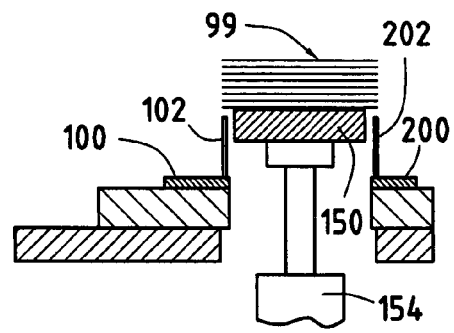
FIG. 10C

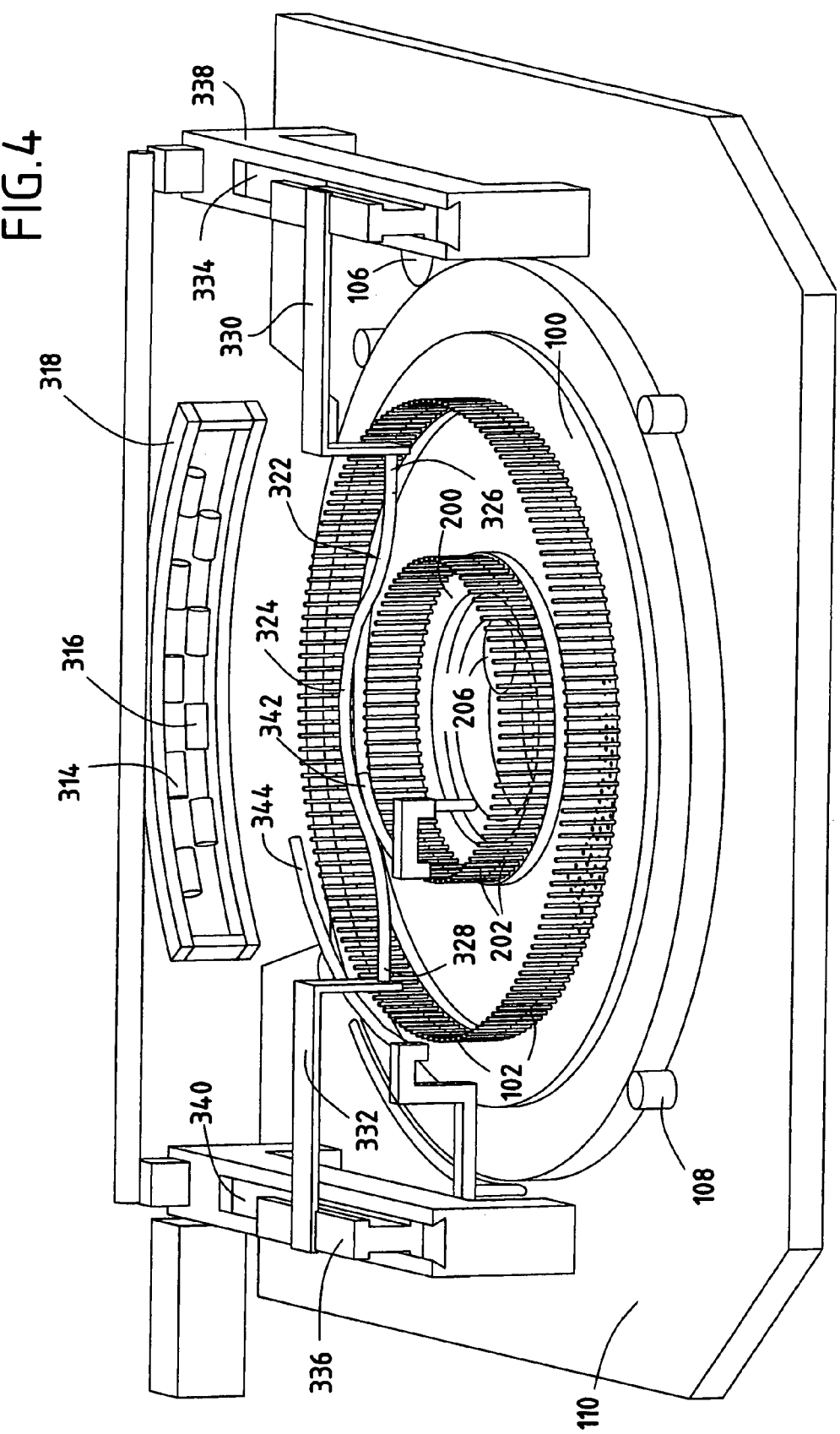

FABRICATING THREE-DIMENSIONAL ANNULAR FIBER STRUCTURES

This application claims priority to a French application No. 05 10811 filed Oct. 24, 2005.

BACKGROUND OF THE INVENTION

The invention relates to fabricating three-dimensional annular fiber structures.

A particular field of the invention is fabricating thick annular fiber preforms for constituting the fiber reinforcement of annular parts made of composite material, in particular brake disks, such as disks made of carbon/carbon (C/C) material for airplane brakes.

One usual process for making annular fiber preforms consists in superposing and bonding together two-dimensional plies to build up plates from which the preforms are cut out. Such a process, as described for example in U.S. Pat. Nos. 4,790,052 and 5,792,715, presents the manifest drawback of wasting a large amount of material, which drawback is particularly penalizing when the fibers are relatively expensive, as is the case for carbon fibers or carbon precursor fibers.

Various proposals have been made to avoid that drawback and to obtain a fiber structure directly in a shape that is as close as possible to the desired annular shape. Thus, proposals are made in U.S. Pat. Nos. 6,009,604 and 5,662,855 to make preforms by superposing and bonding together layers formed by braids that have been wound flat to form a helix. U.S. Pat. Nos. 6,363,593 and 6,367,130 propose using a helical cloth wound in superposed turns that are bonded together.

Those techniques require a fiber fabric (braid or helical cloth) to be made that is an intermediate product between the yarns or tows of fiber and the annular preform that is to be made.

In order to avoid that intermediate step, patent document WO 98/49382 proposes forming a disordered mass of fibers on an annular support and bonding the fibers together by needling. Nevertheless, that document is silent about the means that need to be used in practice in order to obtain an annular preform that is satisfactory, at least in terms of uniformity, for use in certain applications where requirements concerning uniformity are very high, as are requirements concerning quality control of mechanical properties, as applies in particular when the preform is for use as an airplane brake disk preform.

US patent document 2005/0172465 proposes forming an annular preform by regular and controlled deposition of short fibers on a rotary annular turntable with progressive needling. It is thus possible to obtain a preform that is uniform, but at the cost of passing via an intermediate step of obtaining short fibers.

OBJECT AND SUMMARY OF THE INVENTION

In one of its aspects, the invention seeks to provide a method enabling an annular fiber structure to be fabricated directly from commercially available yarns or tows, thereby limiting textile operations so as to reduce the cost of fabrication as much as possible.

This object is achieved by a method comprising the steps consisting in:
providing a first fiber sheet made up of substantially unidirectional elements;
forming a transverse, first annular sheet by laying the first fiber sheet in alternation in one direction and in the opposite direction between coaxial outer and inner circular rings, with the sheet being held at said rings;
providing a second fiber sheet made up of substantially unidirectional elements;
forming a circumferential, second annular sheet by depositing the second fiber sheet in a circumferential direction between said outer and inner rings;
bonding the transverse and circumferential annular sheets to each other; and
driving the transverse and circumferential annular sheets in rotation about the axis of the outer and inner rings so as to execute a plurality of complete revolutions in order to obtain a thick annular fiber structure having layers made up by the transverse sheet alternating with and bonded to layers made up by the circumferential sheet.

The first fiber sheet, and also the second fiber sheet, can be constituted by yarns, or tows, or indeed slivers obtained by spreading out a tow, or a plurality of such tapes that are juxtaposed. It is thus possible to obtain an annular fiber structure directly from yarns or tows with practically no wastage.

According to a feature of the invention, the first fiber sheet is laid while reducing its width between the outer ring and the inner ring, and the circumferential sheet is formed with density that decreases between the outer ring and the inner ring. Advantageously, the transverse annular sheet is laid in such a manner as to give it density that is substantially constant along any one circumference. It is thus possible to obtain a fiber structure that is substantially uniform, with the increase in the density of the transverse sheet due to the first fiber sheet narrowing towards the inner ring being compensated by a decrease in the density of the circumferential sheet.

According to another feature of the method, the first fiber sheet is laid in such a manner that the fiber elements of the transverse annular sheet form an angle lying in the range 45° to 75° with a tangent to the circumferential direction at the middle circumference of the transverse annular sheet. Preferably, this angle is about 60°, thus producing a fiber structure (including the circumferential sheet) in which the fiber elements that intersect in all three directions form between them angles of about 60°.

Advantageously, the annular transverse sheet is held at the outer and inner rings by means of pegs carried by said rings.

Also advantageously, the transverse and circumferential annular sheets are driven in rotation via the outer and inner rings.

According to another feature of the method, the transverse and circumferential annular sheets are formed on a horizontal annular support which is disposed between the outer and inner rings and which is lowered progressively as the annular fiber structure is built up. After the structure has been formed, it can then be disengaged by relative vertical displacement between the annular support and the outer and inner rings.

Advantageously, the bonding between the transverse and circumferential annular sheets is performed progressively while they are being deposited, with this bonding being performed by needling, for example.

According to another feature of the method, the circumferential annular sheet is deposited after the transverse annular sheet has been laid and immediately before the sheets are bonded together.

In another of its aspects, the invention also seeks to provide an installation suitable for implementing the method.

This object is achieved by an installation comprising:

a device for bringing a first fiber sheet and laying it on an annular support alternately in one direction and in the opposite direction between outer and inner coaxial circular rings situated on either side of the annular support so as to form a transverse, first annular sheet;

members for holding the transverse annular sheet at the outer and inner rings;

a device for bringing a second annular sheet onto the annular support and depositing it in the circumferential direction between the outer and inner rings so as to form a circumferential, second annular sheet;

a device for bonding the transverse and circumferential annular sheets together; and a device for driving the transverse and circumferential annular sheets in rotation about the axis of the outer and inner rings.

Advantageously, the device for bringing and laying the first fiber sheet comprises:

a device for feeding the first fiber sheet; and a shuttle-forming member that is movable in translation in reciprocation between a position situated beyond the outer ring and a position situated within the inner ring and capable of acting on the first fiber sheet to bring it towards the inner ring while reducing the width of the sheet. Preferably, the shuttle-forming member presents a curved portion for bearing against the first fiber sheet to bring it to the inner ring while giving it curvature at the inner ring that corresponds to the curvature of the inner ring.

Also advantageously, the members for holding the transverse sheet are pegs carried by the outer and inner rings.

According to another feature of the installation, it further comprises presser members in the form of movable curved bars for contributing to engage the first fiber sheet on the pegs by pressing on the first fiber sheet.

Advantageously, the rotary drive device comprises the outer and inner rings.

Also advantageously, the annular support is movable vertically.

According to another feature of the installation, the bonding device is a needling device disposed immediately downstream from the device for bringing the second fiber sheet onto the support.

BRIEF DESCRIPTION OF THE DRAWINGS

The invention can be better understood on reading the following description given by way of non-limiting indication and with reference to the accompanying drawings, in which:

FIG. 3 is a fragmentary view in perspective and in section showing the FIG. 1 installation;

FIG. 4 is a highly diagrammatic fragmentary view of the FIG. 1 installation showing more particularly the feed and laying device for forming a transverse sheet;

FIGS. 10A to 10C are highly diagrammatic fragmentary views showing an annular fiber structure at two stages of its fabrication and then while it is being removed after it has been fabricated.

DETAILED DESCRIPTION OF EMBODIMENTS OF THE INVENTION

Figure 1:
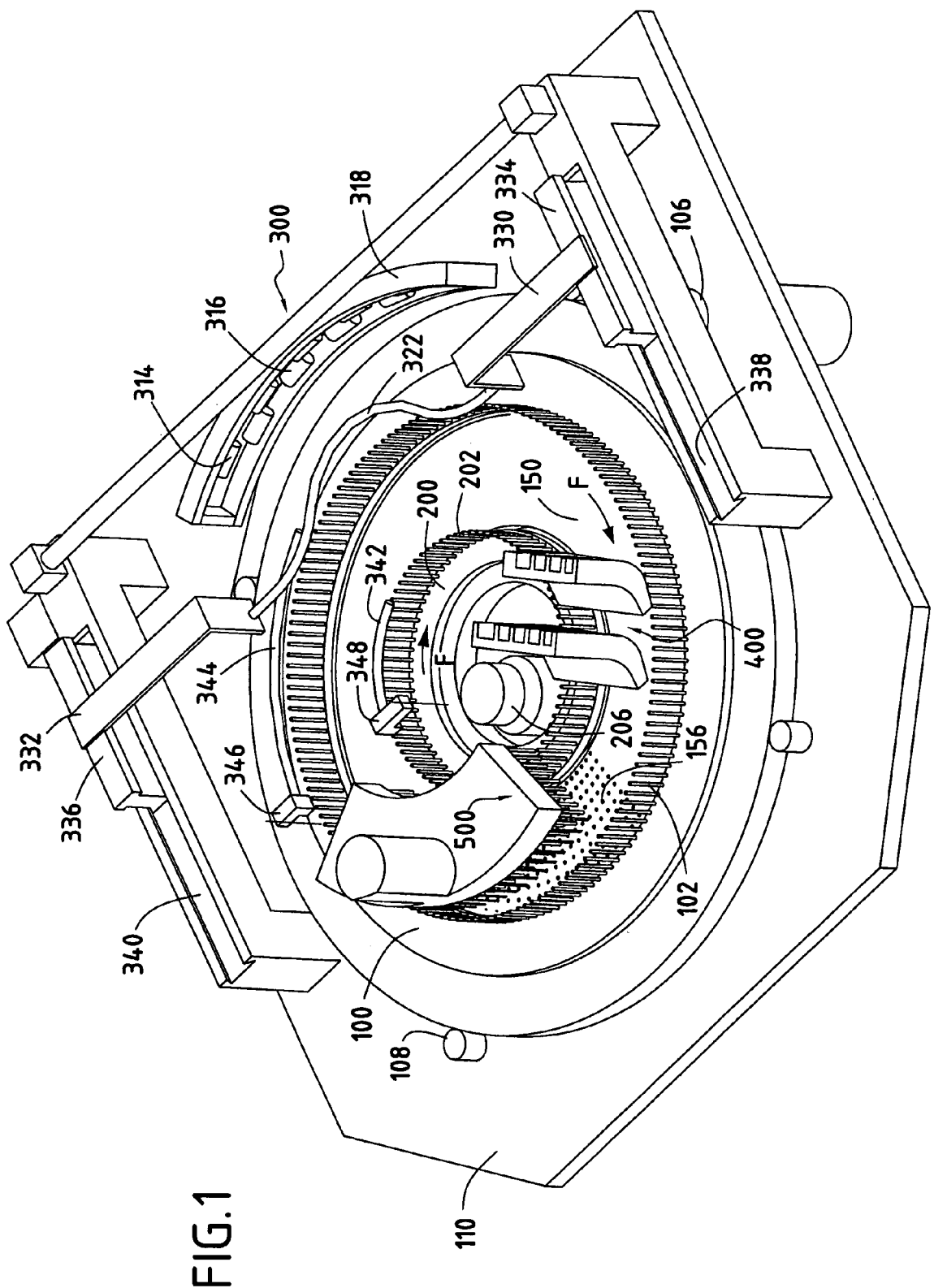
FIG. 1 is a highly diagrammatic general perspective view showing an embodiment of an installation enabling a method in accordance with the invention to be implemented.
Figure 2:
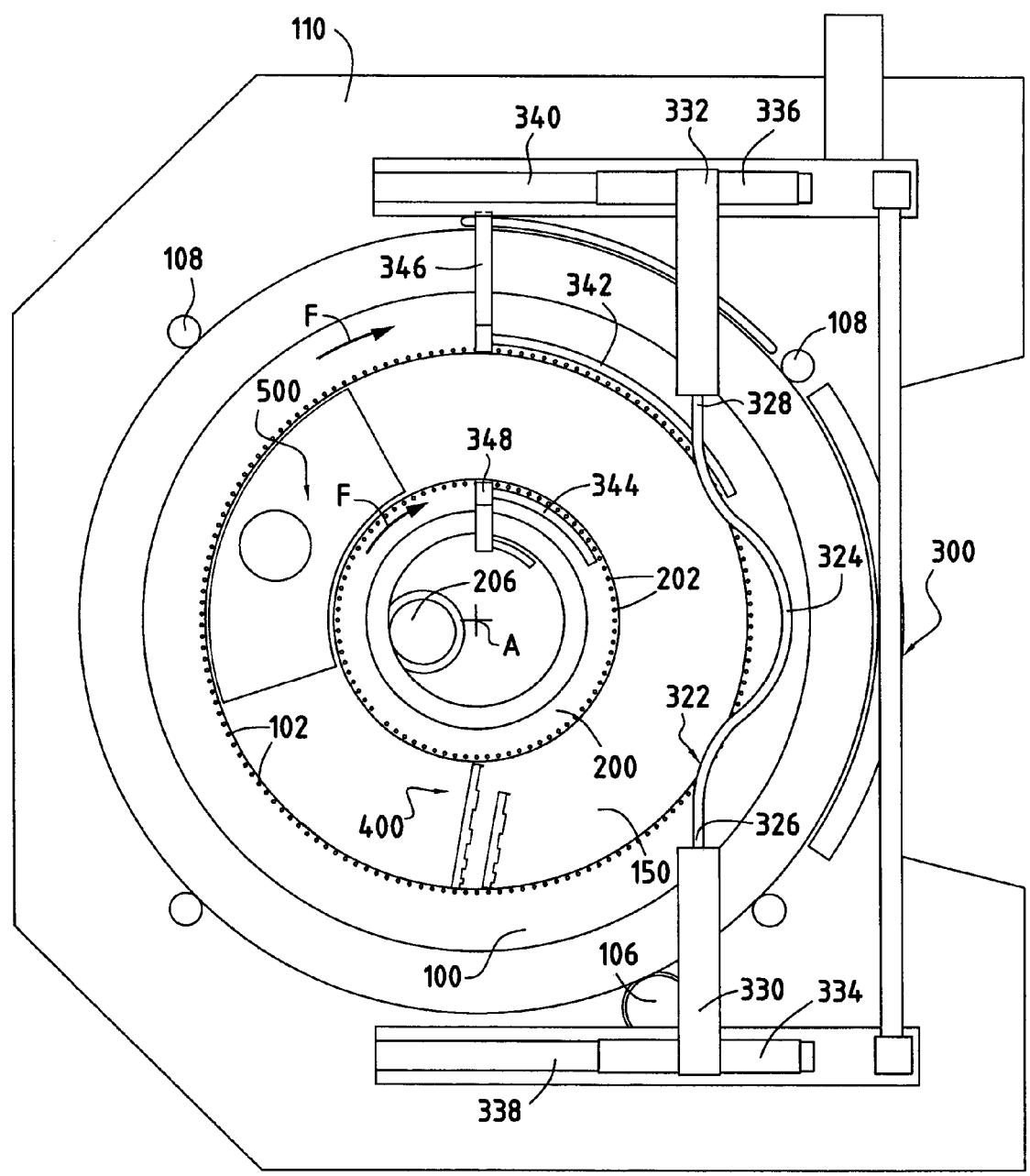
FIG. 2 is a highly diagrammatic plan view of the FIG. 1 installation.

The installation shown in FIG. 1 comprises two horizontal circular rings having a common vertical axis A, namely an outer ring 100 and an inner ring 200 with a horizontal annular tray or support 150 extending between the two rings.

The outer ring 100 carries a circular row of pegs 102, there being several tens of pegs. The pegs 102 extend vertically upwards from a top surface of the ring 100 in the immediate vicinity of its inner edge. Similarly, the inner ring 200 carries a circular row of pegs 202, there being several tens of pegs 202. The pegs 202 extend vertically upwards from the top surface of the ring 200 in the immediate vicinity of its outer edge. The top surfaces of the rings 100 and 200 lie substantially in the same horizontal plane.

The rings 100 and 200 are rotated synchronously about the axis A. Rotary drive may be implemented by means of wheels 106, 206 acting by friction against an outer side surface of the ring 100 and an inner side surface of the ring 200, respectively. The wheels 106, 206 are driven by respective motors, or by the same motor via a transmission, where such drive means are not shown. In a variant, the rings 100, 200 may be driven in rotation by gearwheels meshing with ring gears formed along the outer and inner side edges of the rings 100 and 200 respectively. Wheels (such as 108 for the ring 100) and running tracks (not shown) guide and support the rings 100 and 200 relative to a main structure 110 of the installation.

The annular tray 150 is non-rotary, but it is movable vertically, being supported by the vertical rods 152 of actuators 154 (FIG. 3), e.g. of three actuators. The actuators are synchronized so as to keep the tray substantially horizontal.

The FIG. 1 installation further comprises: a device 300 for feeding and laying a first fiber sheet for forming a transverse sheet extending between the rings 100 and 200; a device 400 for feeding and depositing a second fiber sheet for forming a circumferential sheet extending between the rings 100 and 200; and a device 500 for interconnecting the transverse and circumferential sheets. The feed and deposition device 400 is disposed downstream from the feed and laying device 300 and immediately upstream from the bonding device 500, the terms "upstream" and "downstream" being used herein relative to the direction of rotation of the rings 100 and 200 (arrows F).

Figure 5:
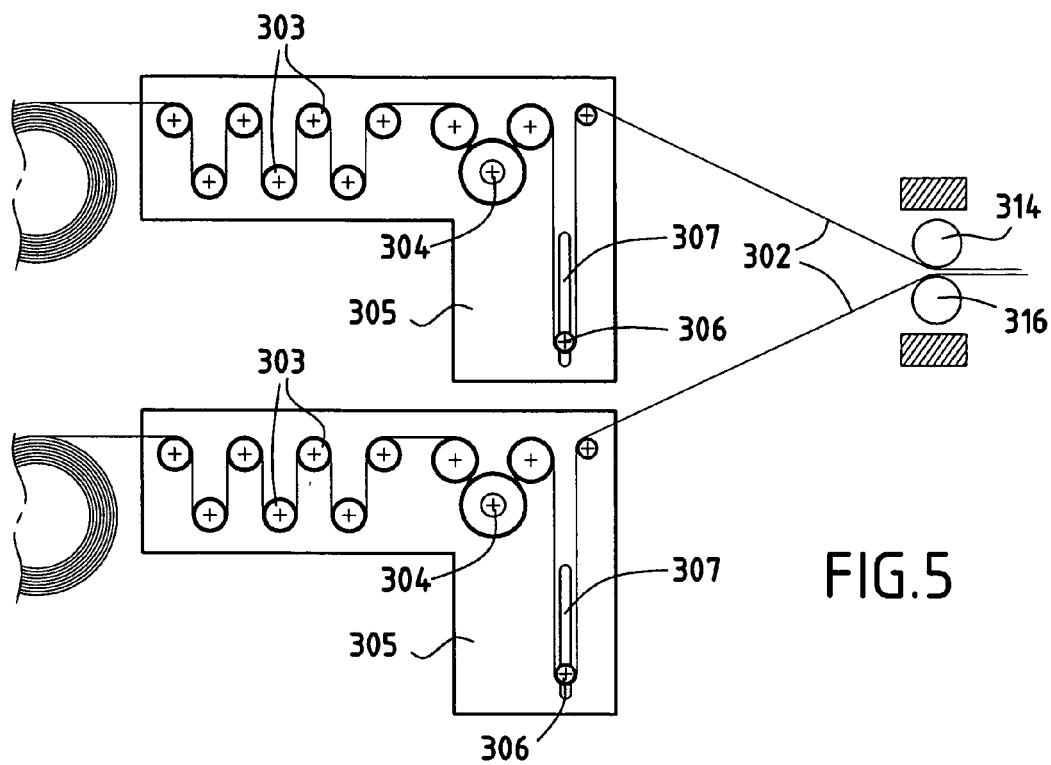
FIG. 5 shows how slivers constituting the transverse sheet are fed.

The feed and laying device 300 (FIGS. 4 to 6) receives a plurality of slivers 302 (FIGS. 5, 6) formed by spreading out respective tows. Each sliver passes over a series of tensioning rollers 303 and over a puller device with a motor-drive wheel 304, the tensioning rollers and the puller device being mounted on a plate 305. Each sliver then passes over a roller 306 constituting a tension regulator, the roller 306 being freely movable in a vertical slot 307 formed in the plate 305. Such a feed device is well known in itself.

Figure 6:
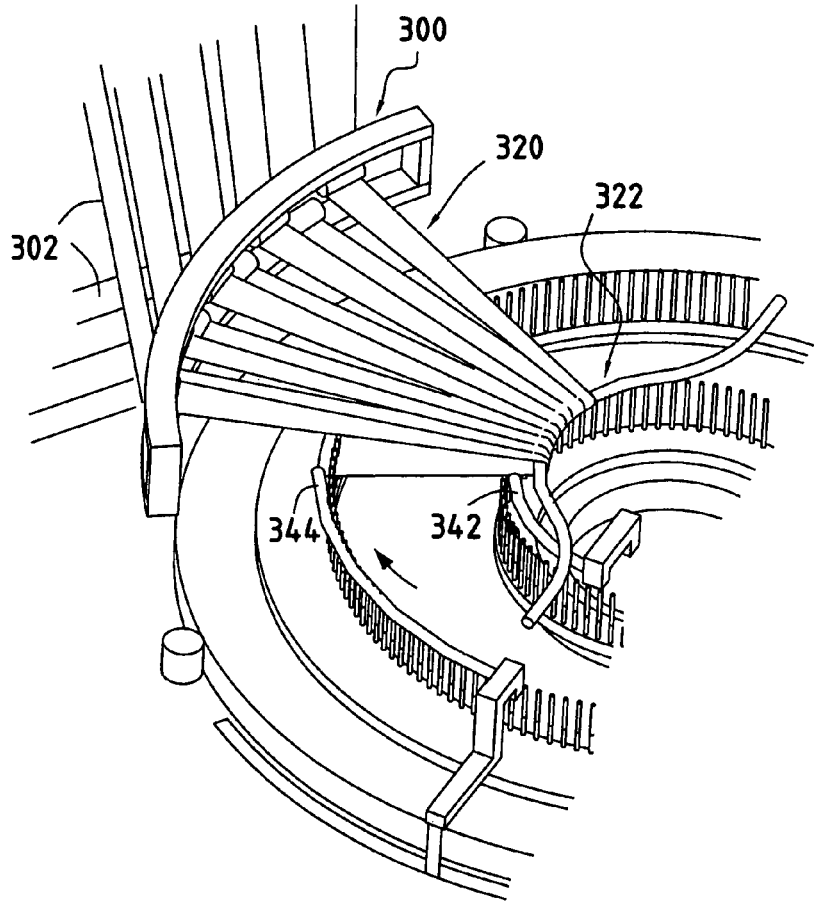
FIG. 6 is a highly diagrammatic fragmentary view from above of the FIG. 1 installation showing the transverse sheet being formed.

Two rows of rollers 314, 316 are mounted in a frame 318 supported by the main structure 110 and receiving the slivers 302 under tension so as to unite them in order to form a fiber sheet 320 by juxtaposing the slivers (FIG. 6). The rollers of the superposed rows 314, 316 are disposed in alternating or staggered manner, and the rows 314, 316 extend along a circular arc centered on the axis A so as to facilitate laying the sheet 320 over an annular sector.

The feed and laying device 300 further comprises a laying member or shuttle 322 that is movable in translation in a direction that is preferably substantially radial in both directions between a rear position situated outside the outer ring 100 and a front position situated inside the inner ring 200. On its path between its rear and front positions, the shuttle 322 passes over the rings 100 and 200.

On its path from the rear position towards the front position, the shuttle 322 guides the sheet 320 so as to bring it to the inner ring 200 while narrowing the sheet so as to impart the shape of an annular sector to the segment of sheet that extends between the rings 100 and 200. For this purpose, the shuttle 322 is formed by a bar having a central portion 324 that is curved with curvature that corresponds to the curvature of the inner end of a segment of sheet. In other words, the central portion 324 is in the form of a circular arc centered on the axis A when the shuttle 322 is in its front position. The central portion 324 is connected to the ends 326 and 328 of the shuttle by curved portions that retain a generally convex shape for the inside of the shuttle that is suitable for ensuring that the sheet 320 is narrowed.

The ends 326, 328 of the shuttle are connected to respective arms 330 and 332 which are secured on blocks 334, 336 that are movable in translation along slideways 338, 340 carried by the main structure 110. The blocks 334, 336 are moved synchronously along the slideways 338, 340 by drive means (not shown) such as actuators, or cables, or belts driven by motors.

The feed and laying device 300 further comprises two presser members 342, 344, respectively an outer member and an inner member, each in the form of a horizontal curved bar. The presser members or curved bars 342, 344 are designed to engage the ends of each fiber sheet segment 106 laid between the rings 100 and 200 on the pegs 102, 202. The bar 342 extends over an arc of a circle centered on the axis A and situated immediately outside the row of pegs 102. The bar 342 is of a length that is not less than and that is preferably greater than the length of the outer end of a segment of the laid fiber sheet 106. The bar 344 extends over an arc of a circle centered on the axis A and situated immediately inside the row of pegs 202. The bar 344 is of a length that is not less than and that is preferably greater than the length of the inner end of a segment of the laid fiber sheet 106. The bars 344, 346 are substantially semicircular in section, each having its plane side facing the corresponding pegs 102, 202.

At their upstream ends, the bars 342, 344 are carried by brackets 346, 348. The bracket 346 has a horizontal portion extending over the ring 100 and connected on the outside of the ring to a vertical portion extending downwards to below the level of the tray 150. The bracket 348 has a horizontal portion extending over the ring 200 and it is connected on the inside of the ring to a vertical portion extending downwards to beneath the level of the tray 150. The bars 342, 344 are movable vertically and also in pivoting about the axis A, as described in greater detail below. For this purpose, the brackets 346, 348 may be driven by a rotary-linear actuator.

The laying of the fiber sheet 320 by means of the shuttle 322 and the bars 342, 344 is described below with reference to FIGS. 7A to 7G and 8.

Figure 7A:
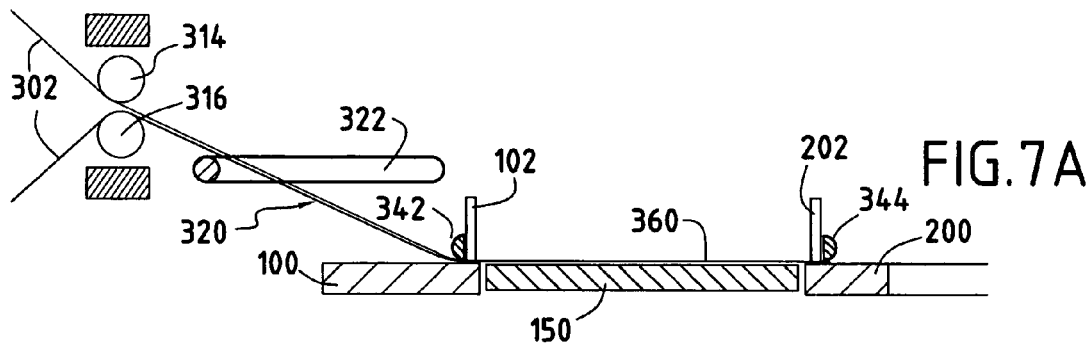
FIGS. 7A to 7G show successive steps in the laying process enabling the transverse sheet to be formed.

In FIG. 7A, a segment 360 of the sheet 320 has been laid and engaged on the pegs 102 and 202 by means of the bars 342, 344, the shuttle 322 being in its rear position.

Figure 7B:
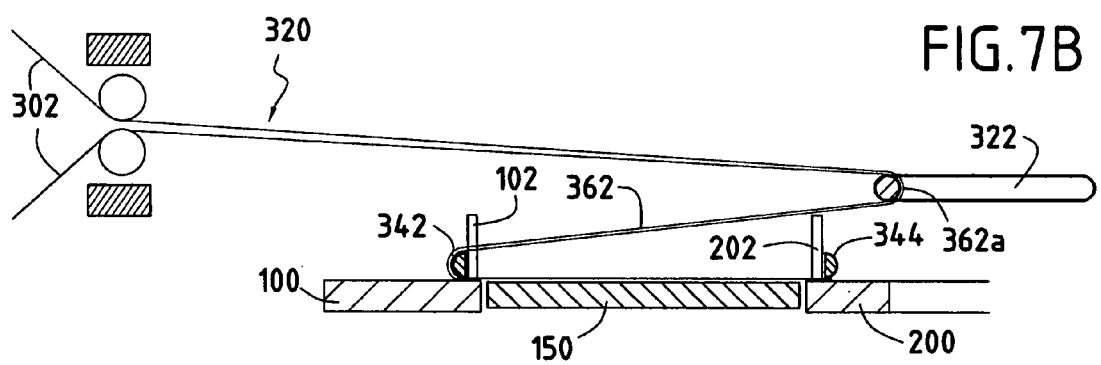
Figure 7C:
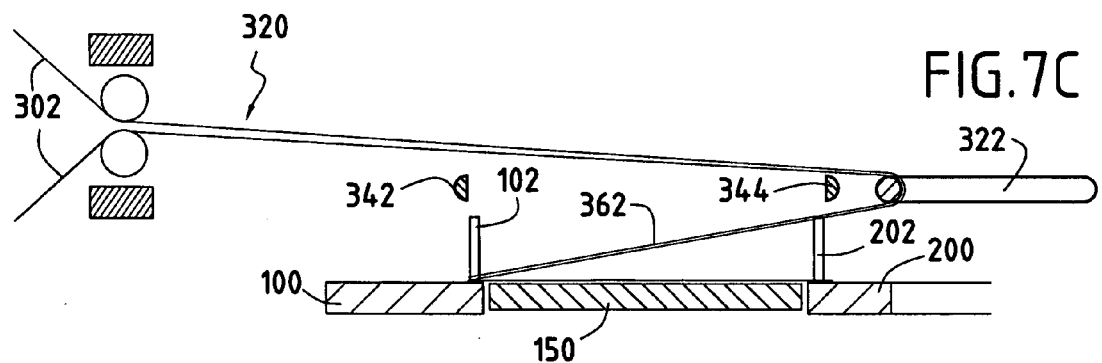

The shuttle 322 is then moved towards its front position, taking the sheet 320 towards the inner ring 200, passing over the bar 342 (FIG. 7B). The shuttle 322 bears via its inner side against the sheet 320 and causes the sheet to become progressively narrower, reducing its width while also giving it the desired curvature at the inside end 362b of the newly delivered segment of sheet 362.

Figure 7D:
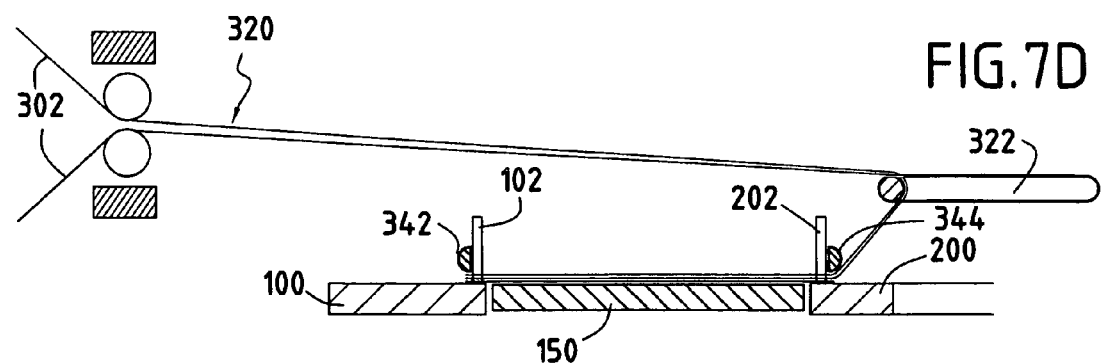

The bars 342, 344 are moved successively in rotation in the upstream direction so as to become completely disengaged from under the segment 362 so that the sheet 320 is held tight against the pegs 102 under the effect of the tension in the sheet, after which the bars are moved upwards and then downstream (this is the situation shown in FIG. 6) so as to be above the segment 362 (FIG. 7C) and finally the bars are moved downwards to engage the segment 362 on the pegs 102, 202, being pressed against the inner and outer rings (FIG. 7D).

Figure 7E:
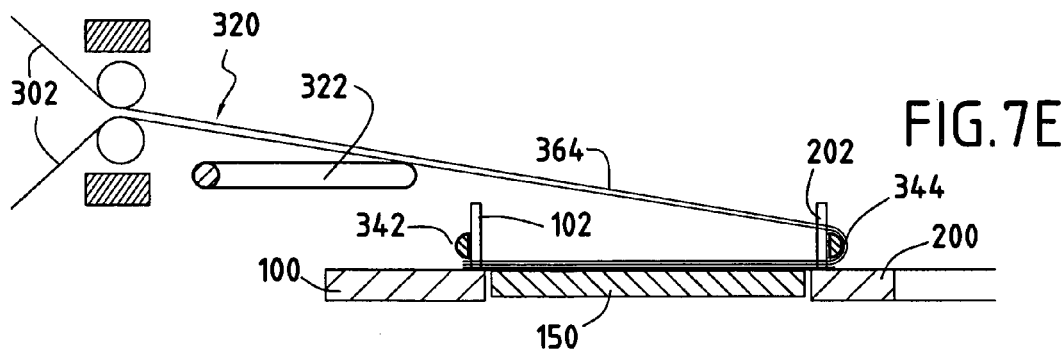
Figure 7F:
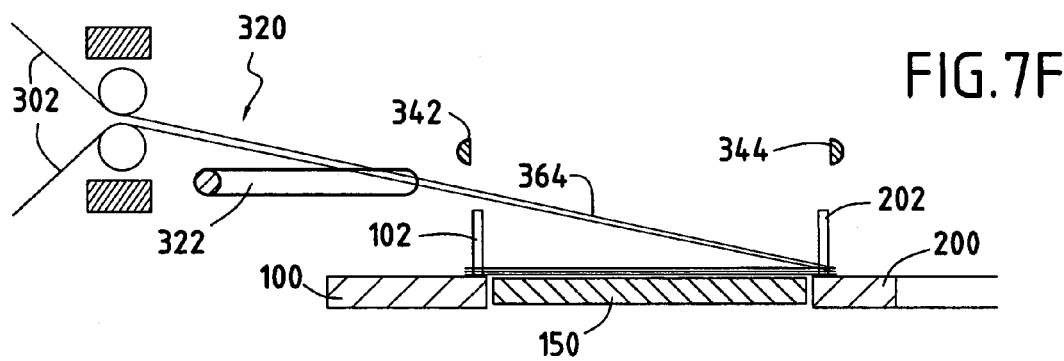

The shuttle 322 is then moved towards its rear position. Under the effect of the tension exerted on the slivers making up the sheet 320, the sheet winds around the bar 344 and a new segment 364 of sheet extends between the inner and outer rings (FIG. 7E).

Figure 7G:
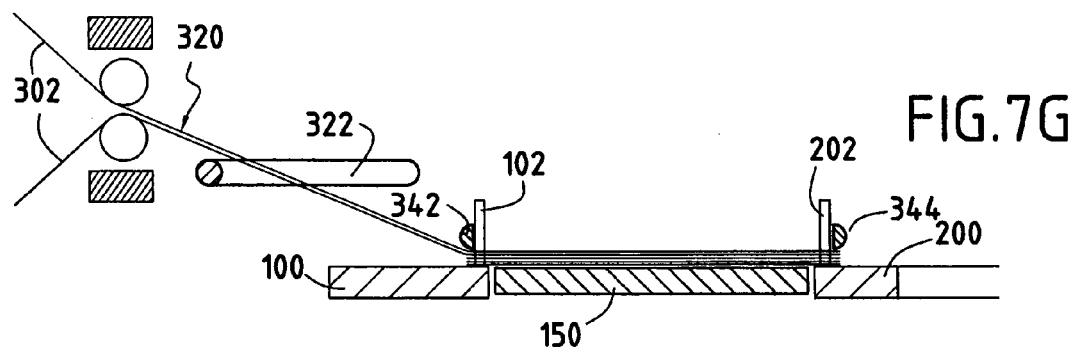

The bars 342, 344 are again moved in succession in rotation upstream so as to be completely disengaged from beneath the segment 364 so that the sheet 320 is tightened close around the pegs 202 under the effect of its tension, and the bars are then moved upwards, and then downstream so as to be placed above the segment 364 (FIG. 7F), and finally downwards so as to engage the segment 364 on the pegs 102, 202 (FIG. 7G). This is back in the same configuration as in FIG. 7A, and the process can be continued in the same way.

The sheet 320 is laid while also driving the rings 100 and 200 in rotation. The rotary movement may be continuous. Care is then taken to ensure that the bars 342, 344 are of a length that is sufficient to enable them to press against the entire width of the sheet while engaging it against the pegs 102, 202. It would also be possible for the rings 100 and 200 to be caused to turn discontinuously, for example stopping while the bars 322, 344 are acting against the sheet 320.

Figure 8:
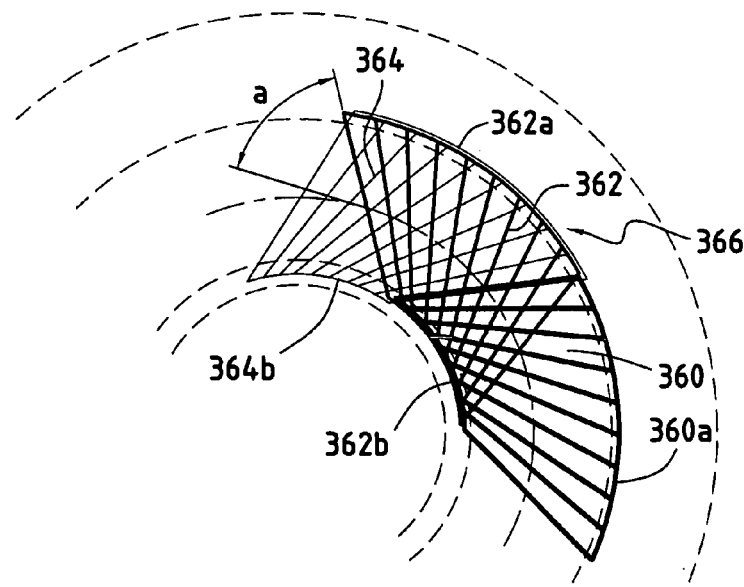
FIG. 8 is a fragmentary view of the resulting transverse sheet.

By the effect of the rings 100, 200 turning, the segments 360, 362, 364 of the sheet 320 that are laid in succession cross one another in the manner shown in FIG. 8. The rotary movement of the rings 100, 200 and the movement in translation of the shuttle 322 are preferably selected in such a manner that for a given width of sheet 320, the successive outer ends such as 360a and 362a and the successive inner ends such as 362b, 364b of the sheet segments are juxtaposed. This produces a transverse sheet 366 extending between the rings 100 and 200 and presenting density that is substantially constant along any given circumference, but with density that increases between the outer ring 100 and the inner ring 200. It is also preferable to ensure that the width of the sheet is such that the slivers 302 of the successively-laid sheet segments form an angle $a$ lying in the range 45° to 75° relative to a tangent to the circumferential direction at the middle circumference. More preferably, this angle $a$ is about 60°, as shown in FIG. 8.

The feed and deposition device 400 (FIG. 9) receives a plurality of slivers 402 each formed by spreading a tow. The slivers 402 pass over tensioner and preparation devices (not shown) analogous to those shown in FIG. 5, and then over deflector rollers 406, and they are guided to be above and close to the top surface of the tray 150 by guides 408, 410. As shown in section and on a larger scale in FIG. 9A, the guides 408, 410 are in the form of combs, each defining a row of passages aligned in a direction that is substantially radial between the rings 100 and 200. The guides 408, 410 are disposed close to each other with the passages of the guide 408 being interposed (or staggered) relative to the passages of the guide 410. The slivers coming out of the guides 408, 410 are juxtaposed so as to form a circumferential sheet 420 extending between the rings 100 and 200. The slivers 402 reach the guides 408, 410 in a direction that is vertical or that slopes relative to the tray 150. The guides 408, 410 and the passages they include are given a curved shape so that the slivers 402 leave the guides substantially tangentially relative to the horizontal. The guides 408, 410 have passages of width corresponding to the widths of the slivers 402. They thus serve to control width and positioning of the slivers 402 that make up the circumferential sheet 420.

Since the device 400 is located downstream from the device 300, the circumferential sheet 420 is deposited on top of the transverse sheet 360 on the tray 150 between the rings 100, 200. In the configuration shown in FIG. 8 where the elements (slivers 302) of the sheet 360 form an angle of about 60° relative to the tangent to the circumferential direction at the middle circumference, adding the circumferential sheet provides elements (slivers 402) which, at that level also form an angle of 60° relative to the elements of the sheet 360, which means that after the sheets have been bonded together the reinforcing elements are in a configuration of 3×60° approximately.

Figure 9:
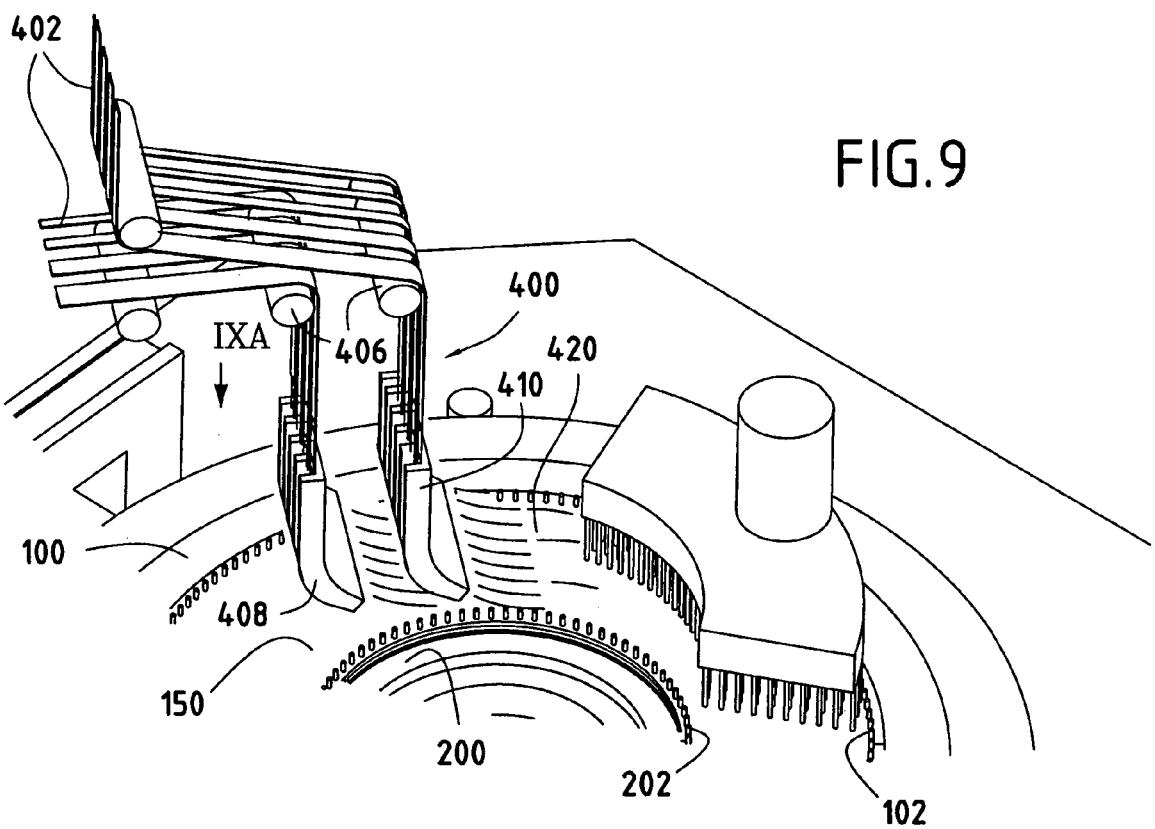
FIGS. 9 and 9A are highly diagrammatic fragmentary views showing more particularly the feed and deposition device enabling a circumferential sheet to be formed.
Figure 9A:
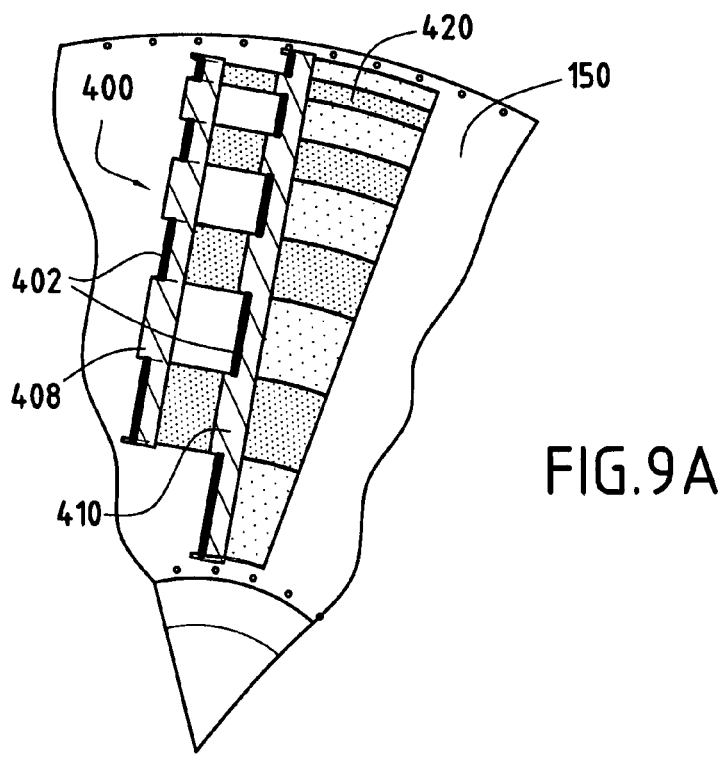

The sheet 420 is advantageously given density that decreases between the outer ring 100 and the inner ring 200 so as to compensate for the increase in density of the sheet 360 and obtain an overall sheet 360 plus 420 of density that is substantially uniform across its entire width. For this purpose, the sheet 420 may be formed with slivers having the same width but coming from cables of decreasing weights between the outer and inner rings, or with slivers coming from cables having the same weight but of increasing width (greater spreading) as shown in FIG. 9, or by using a combination of those two techniques.

The bonding device 500 is advantageously constituted by a needling device. It comprises a needling head 502 which is driven with reciprocating vertical motion, e.g. by a crank type mechanism (not shown). The head 502 carries a plurality of barbed needles 504 that serve to bond together the sheets 360 and 420 by taking hold of fibers and moving them in a vertical direction (Z direction), in well-known manner.

The needling head extends over a ring sector. The portion of the tray 150 situated under the needling head presents perforations 156 in register with the needles 504 so that the needles can pass through the perforations without damaging the tray, the needles being distributed so as to obtain a substantially uniform density of needling between the outer and inner edges.

The disposition of the bonding device 500 immediately downstream from the device 400 enables the sheet 420 to be secured immediately after it has been deposited and limits any risk of the sheet 420 becoming disorganized prior to being secured to the sheet 360. This disposition is therefore preferred, but not necessary. It is possible to envisage depositing the circumferential sheet before forming the transverse sheet.

As the rings 100, 200 turn, a fiber structure is built up, being formed by superposed layers constituted in alternation by the transverse sheet 360 and by the circumferential sheet 420 that themselves are wound in superposed and interleaved helixes. Needling is performed with the needles penetrating through more than two layers so that the newly-formed portions of the sheets 360 and 420 are bonded not only to each other, but also to the underlying portion of the annular fiber structure that is being built up.

In order to obtain substantially uniform bonding throughout the thickness of the fiber structure, it is desirable to ensure that the penetration depth of the needles is substantially constant. For this purpose, as the fiber structure is built up, the support tray 150 is moved downwards. At the beginning of formation of the fiber structure, the support tray 150 is at a horizontal level situated close to the tops of the pegs 102, 202 (FIG. 10A). Thereafter, the support tray 150 is moved downwards (FIG. 10B) with the transverse and circumferential sheets continuing to be formed at substantially the same horizontal level. The penetration depth of the needles corresponds to more than two layers, with the needles passing through the perforations 156 in the tray at the beginning of the process, and subsequently, once the fiber structure has reached a certain thickness, the needles no longer reach the bottom layer of the structure.

It should be observed that the technique of bonding together the fiber layers by needling as their superposition is being built up on a support, with the support being lowered progressively so as to conserve a substantially constant penetration depth for the needles, is itself well known. Thus, in the present circumstances, it is possible for the tray 150 to be lowered in compliance with a relationship similar to that described in above-mentioned U.S. Pat. No. 5,792,715, and the penetration depth of the needles can be controlled in the manner described in U.S. Pat. No. 6,374,469. The downward movement of the tray 150 can take place continuously, or discontinuously with a downward step being imposed after each complete rotation of the rings 100 and 200.

While the fiber structure that is being built up is being subjected to bonding by needling, it is held laterally in position by the successive turns of the transverse sheet 360 being engaged on the pegs 102, 202, with the bars 342, 344 causing the fiber structure to move down progressively along the pegs each time they are pressed against the most recently laid segment of the sheet 320. It is therefore necessary to ensure that the pegs are of a height that is not less than, and that is preferably a little taller than, the thickness of the annular fiber structure that is to be made.

Once the thickness desired for the annular fiber structure has been reached, the needling head 502 and the guides 408, 410 are retracted, the shuttle 322 is taken to its rear position, the sheets 360 and 420 are cut, and the fiber structure is removed by raising the tray 150 so as to disengage the pegs 102, 202 (FIG. 10C). In a variant, the fiber structure could be disengaged by lowering the inner and outer rings 100 and 200, with the tray 150 being held in the position it reaches at the end of building up the fiber structure, for example.

In the above description, each sheet 320, 420 is described as being made by means of a plurality of juxtaposed slivers obtained by spreading tows. In a variant, one and/or the other of the sheets 320, 420 could be formed by spreading a single tow, or by an assembly of unidirectional yarns or tows.

In other variant embodiments, the tows could be spread, and the sheets could be positioned automatically, by making use of automatic systems of the kind described in U.S. Pat. Nos. 6,684,564 and 6,690,987.

The nature of the fibers constituting the fiber sheets 320 and 420 depends on the intended application. When the annular fiber structures constitute preforms for C/C composite brake disks, it is possible to use carbon fibers or carbon precursor fibers, e.g. fibers of preoxidized polyacrylonitrile. When using carbon precursor fibers, a final transformation into carbon is performed by heat treatment after the fiber structure has been made.

EXAMPLES 1 TO 4

A fiber structure for constituting an annular preform for a C/C composite material brake disk and having an outer diameter $D_o$ of 445 millimeters (mm) and an inner diameter $D_i$ of 226 mm was made by superposing and needling a transverse sheet and a circumferential sheet obtained as follows.

Carbon tows were used made up of 50,000 filaments (50 K) or 24,000 filaments (24 K) having respective linear weights of 3.7 kilotex (kTex) and 1.6 kTex. The number of tows which, after being spread, constitute the transverse sheet and the longitudinal sheet, and the widths W of the slivers obtained by spreading the tows were selected so as to obtain a preform having substantially uniform density with the following characteristics:

- an angle a between the slivers forming the transverse sheet and a tangent to the middle circumference lying in the range 45° to 75°, and preferably being about 60°; and
- a ratio R between the weight fraction represented by the circumferential sheet and the weight fraction represented by the transverse sheet of about 1/3: 2/3.

Table 1 below gives various possible combinations for obtaining the desired characteristics.

TABLE 1

| Example | Tows used | Transverse sheet | Circumferential sheet | R | a |
| --- | --- | --- | --- | --- | --- |
| 1 | 50K 3.7 kTex | 13 tows W at $D_o$ = 25.9 mm W at $D_i$ = 17.7 mm | 9 tows W varying from 8 mm at $D_o$ to 27 mm at $D_i$ | 35:65 | 60° |
| 2 | 50K 3.7 kTex | 11 tows W at $D_o$ = 22.6 mm W at $D_i$ = 7.9 mm | 7 tows W varying from 10 mm at $D_o$ to 33 mm at $D_i$ | 34:66 | 58.4° |
| 3 | 50K 3.7 kTex | 20 tows W at $D_o$ = 17.4 mm W at $D_i$ = 4.9 mm | 9 tows W varying from 8 mm at $D_o$ to 27 mm at $D_i$ | 32:68 | 54.3° |
| 4 | 24K 1.6 kTex | 28 tows W at $D_o$ = 8.9 mm W at $D_i$ = 3.1 mm | 18 tows W varying from 4.7 mm at $D_o$ to 11 mm at $D_i$ | 34:66 | 58.4° |

EXAMPLES 5 TO 8

The procedure was the same as in Examples 1 to 4, but with different inner and outer diameters, namely $D_o$=553 mm and $D_i$=289 mm.

Table 2 below gives various possible configurations obtaining the same desired characteristics for the angle a and the ratio R as in Examples 1 to 4.

TABLE 2

| Example | Tows used | Transverse sheet | Circumferential sheet | R | a |
| --- | --- | --- | --- | --- | --- |
| 5 | 50K 3.7 kTex | 17 tows W at $D_o$ = 18.0 mm W at $D_i$ = 6.1 mm | 11 tows W varying from 8 mm at $D_o$ to 20 mm at $D_i$ | 35:65 | 56.2° |
| 6 | 50K 3.7 kTex | 14 tows W at $D_o$ = 21.8 mm W at $D_i$ = 7.4 mm | 8 tows W varying from 9 mm at $D_o$ to 29 mm at $D_i$ | 32:68 | 75° |
| 7 | 50K 3.7 kTex | 12 tows W at $D_o$ = 13.1 mm W at $D_i$ = 6.4 mm | 12 tows W varying from 7 mm at $D_o$ to 23 mm at $D_i$ | 32:68 | 75° |
| 8 | 24K 1.6 kTex | 28 tows W at $D_o$ = 10.9 mm W at $D_i$ = 3.7 mm | 18 tows W varying from 4 mm at $D_o$ to 12 mm at $D_i$ | 34:66 | 56.2° |

What is claimed is:

1. A method of fabricating an annular fiber structure, the method comprising the steps of:
   providing a first fiber sheet made up of substantially unidirectional elements;
   forming a transverse, first annular sheet by laying the first fiber sheet in alternation in one direction and in the opposite direction between coaxial outer and inner circular rings, with the sheet being held at said rings;
   providing a second fiber sheet made up of substantially unidirectional elements;
   forming a circumferential, second annular sheet by depositing the second fiber sheet in a circumferential direction between said outer and inner rings;
   bonding the transverse and circumferential annular sheets to each other; and
   driving the transverse and circumferential annular sheets in rotation about the axis of the outer and inner rings so as to execute a plurality of complete revolutions in order to obtain a thick annular fiber structure having layers made up by the transverse sheet alternating with and bonded to layers made up by the circumferential sheet.

2. A method according to claim 1, wherein the first fiber sheet is laid while reducing its width between the outer ring and the inner ring, and the circumferential sheet is formed with density that decreases between the outer ring and the inner ring.

3. A method according to claim 1, wherein the transverse annular sheet is laid in such a manner as to give it density that is substantially constant along any one circumference.

4. A method according to claim 1, wherein the first fiber sheet is laid in such a manner that the fiber elements of the transverse annular sheet form an angle lying in the range 45° to 75° with a tangent to the circumferential direction at the middle circumference of the transverse annular sheet.

5. A method according to claim 4, wherein said angle is about 60°.

6. A method according to claim 1, wherein the first fiber sheet is formed by a spread tow or a plurality of juxtaposed spread tows.

7. A method according to claim 1, wherein the second fiber sheet is formed by a spread tow or a plurality of juxtaposed spread tows.

8. A method according to claim 1, wherein the annular transverse sheet is held at the outer and inner rings by means of pegs carried by said rings.

9. A method according to claim 8, wherein the transverse and circumferential sheets are driven in rotation via the outer and inner rings.

10. A method according to claim 1, wherein the transverse and circumferential annular sheets are formed on a horizontal annular support which is disposed between the outer and inner rings and which is lowered progressively as the annular fiber structure is built up.

11. A method according to claim 10, wherein, after the annular fiber structure has been formed, it is disengaged by relative vertical displacement between the annular support and the outer and inner rings.

12. A method according to claim 1, wherein the bonding between the transverse and circumferential annular sheets is performed progressively while they are being deposited.

13. A method according to claim 1, wherein the bonding between the transverse and circumferential annular sheets is obtained by needling.

14. A method according to claim 1, wherein the circumferential annular sheet is deposited after the transverse annular sheet has been laid and immediately before the sheets are bonded together.

15. An installation for fabricating an annular fiber structure, the installation comprising:
- a device for bringing a first fiber sheet and laying it on an annular support alternately in one direction and in the opposite direction between outer and inner coaxial circular rings situated on either side of the annular support so as to form a transverse, first annular sheet;
- members for holding the transverse annular sheet at the outer and inner rings;
- a device for bringing a second annular sheet onto the annular support and depositing it in the circumferential direction between the outer and inner rings so as to form a circumferential, second annular sheet;
- a device for bonding the transverse and circumferential annular sheets together; and
- a device for driving the transverse and circumferential annular sheets in rotation about the axis of the outer and inner rings.

16. An installation according to claim 15, wherein the device for bringing and laying the first fiber sheet comprises:
- a device for feeding the first fiber sheet; and
- a shuttle-forming member that is movable in translation in reciprocation between a position situated beyond the outer ring and a position situated within the inner ring and capable of acting on the first fiber sheet to bring it towards the inner ring while reducing the width of the sheet.

17. An installation according to claim 16, wherein the shuttle-forming member presents a curved portion for bearing against the first fiber sheet to bring it to the inner ring while giving it curvature at the inner ring that corresponds to the curvature of the inner ring.

18. An installation according to claim 15, wherein the members for holding the transverse sheet are pegs carried by the outer and inner rings.

19. An installation according to claim 18, further comprising presser members in the form of movable curved bars for contributing to engage the first fiber sheet on the pegs by pressing on the first fiber sheet.

20. An installation according to claim 15, wherein the rotary drive device comprises the outer and inner rings.

21. An installation according to claim 15, wherein the annular support is movable vertically.

22. An installation according to claim 15, wherein the bonding device is a needling device disposed immediately downstream from the device for bringing the second fiber sheet onto the support.

* * * * *